(12) United States Patent
Schmitt et al.

(10) Patent No.: US 9,956,934 B2
(45) Date of Patent: May 1, 2018

(54) ROLLOVER PROTECTIVE DEVICE

(71) Applicant: Dr. Ing. h.c. F. Porsche Aktiengesellschaft, Stuttgart (DE)

(72) Inventors: Hans-Juergen Schmitt, Muehlacker (DE); Bjoern Dunst, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days. days.

(21) Appl. No.: 15/622,440

(22) Filed: Jun. 14, 2017

(65) Prior Publication Data

US 2017/0361799 A1    Dec. 21, 2017

(30) Foreign Application Priority Data

Jun. 21, 2016  (DE) .................. 10 2016 111 355

(51) Int. Cl.
  B60R 21/13  (2006.01)
(52) U.S. Cl.
  CPC ........ B60R 21/13 (2013.01); *B60R 2021/132* (2013.01); *B60R 2021/134* (2013.01); *B60Y 2410/124* (2013.01)
(58) Field of Classification Search
  CPC .............. B60R 21/13; B60R 2021/132; B60R 2021/134
  USPC ....................................................... 280/756
  See application file for complete search history.

(56) References Cited

U.S. PATENT DOCUMENTS

| 5,273,314 A * | 12/1993 | Sakakibara ........... B60R 21/045 188/377 |
| 6,315,326 B1 | 11/2001 | Muller et al. |
| 7,744,125 B2 * | 6/2010 | Tang .................... B60N 2/4242 280/756 |
| 9,533,645 B2 * | 1/2017 | Schmitt .................... B60R 21/13 |
| 2006/0290124 A1 * | 12/2006 | Kasubke ................ B60R 21/13 280/756 |
| 2016/0257274 A1 * | 9/2016 | Schmitt .................... B60R 21/13 |

FOREIGN PATENT DOCUMENTS

| DE | 44 44 894 | 6/1996 | |
| DE | 298 13 152 | 12/1998 | |
| DE | 102 42 832 | 3/2004 | |
| DE | 102007058335 A1 * | 6/2009 | ............ B60R 21/13 |
| DE | 10 2009 011 066 | 9/2010 | |
| DE | 102009011066 A1 * | 9/2010 | ............ B60R 21/13 |
| DE | 10 2009 039 215 | 3/2011 | |
| GB | 2280456 A * | 2/1995 | ............ B60J 5/0444 |
| JP | 2017007655 A * | 1/2017 | ............ B60R 21/13 |

OTHER PUBLICATIONS

German Search Report dated Feb. 23, 2017.

* cited by examiner

*Primary Examiner* — Faye M Fleming
(74) *Attorney, Agent, or Firm* — Gerald E. Hespos; Michael J. Porco; Matthew T. Hespos

(57) ABSTRACT

A rollover protective device (1) for a passenger vehicle has a supporting device (3) extending in the vertical elevation (2) when installed correctly. A crossbar (5) is fastened to the supporting device (3) and extends in a lateral direction (4) when installed correctly. The crossbar (5) is of beam-shaped design and is formed by a sheet metal construction (6) with a deformed front side and/or upper side (7, 8) and an inner supporting structure (9).

20 Claims, 6 Drawing Sheets

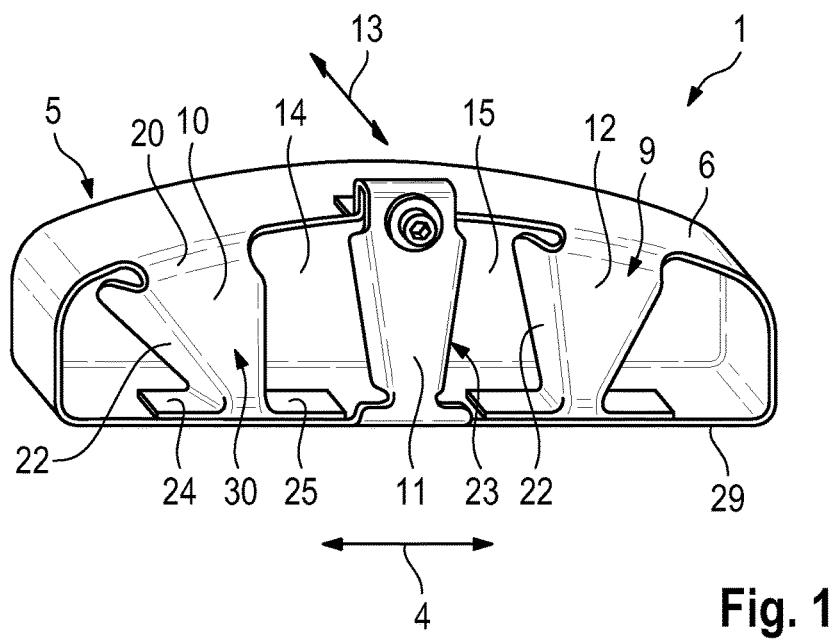

ROLLOVER PROTECTIVE DEVICE

CROSS REFERENCE TO RELATED APPLICATION

This application claims priority under 35 USC 119 to German Patent Appl. No. 10 2016 111 355.7 filed on Jun. 21, 2016, the entire disclosure of which is incorporated herein by reference.

BACKGROUND

1. Field of the Invention

The invention relates to a rollover protective device for a passenger vehicle, with a supporting device that extends vertically when installed correctly, and a crossbar fastened to the supporting device and extending in a lateral direction when installed correctly.

2. Description of the Related Art

A very wide variety of rollover protective devices for passenger vehicles have been disclosed in the prior art. For example, DE 102 42 832 A1 presents a three-part roll bar for motor vehicles, over which the motor vehicle rolls upon overturning. The roll bar here has three bar components, specifically two bar leg tubes and a bar head of tubular and U-shaped design. The bar leg tubes here are screwed to the tubular bar head at associated connecting points. The roll bar and the bar leg tubes can be metallic die cast or forged parts or fiber reinforced plastics parts. A disadvantage of these is that only a small lateral region is covered. In addition, there may be an unfavorable ratio of material use to deformation capability.

It is therefore the object of the present invention to provide a rollover protective device which permits improved properties.

SUMMARY

A rollover protective device according to the invention is provided for a passenger vehicle and comprises a supporting device extending in the vertical direction when installed correctly and a crossbar extending in a lateral direction when installed correctly and fastened to the supporting device. The crossbar may be substantially beam-shaped and may have generous rounded portions. The crossbar is formed at least to a substantial part of a sheet metal construction with a deformed front side and/or upper side and an inner supporting structure, The rollover protective device of the invention has many advantages. For example, the crossbar is beam-shaped and thus can cover a sufficient width while providing a large contact area. The rollover protective device of the invention permits an optimum ratio of material use and deformation capability. The crossbar is formed from sheet metal with an inner supporting structure. Therefore, many design options are available. In particular, care is taken in the deformation to ensure that sharp edges are avoided, and therefore an additional covering is generally unnecessary.

The rollover protective device is suitable for passenger vehicles, commercial vehicles and, in particular, for convertibles. An optimum use of the construction space is possible. In all configurations, it is possible for the crossbar to consist of a single component or to be formed from plural crossbar parts. Each crossbar part can be formed by a deformed metal sheet and/or by a punched/bent part.

The sheet metal may comprise a basic body of the crossbar, and the basic body may define the beam-like structure of the crossbar. The basic body may be hollow and may be reinforced by the supporting structure.

In preferred refinements, the supporting structure comprises rib- or foot-like supporting units. Supporting units permit the construction of a stable and nevertheless light supporting structure that is suitable for dissipating considerable forces. The supporting structure may be a single-part and may comprise the plural supporting units formed in a rib- or foot-like manner or in some other way. However, the supporting structure may comprise plural separate supporting units arranged and/or fastened in the interior of the sheet metal construction to provide the necessary stability for the rollover protective device and in particular for the crossbar.

A cavity may be provided between at least two supporting units. As a result, the weight is reduced while the necessary rigidity is provided.

At least one supporting unit may form a cavity, and a cavity may be formed on each supporting unit. The supporting units may extend substantially vertically in the correctly installed state. In a horizontal cross section, a supporting unit can have an approximately V- or U-shaped cross section or a rectangular cross section.

The crossbar may comprise one or more metal sheets. A wall thickness in the region of the sheet metal construction and in the region of the supporting structure is substantially identical. The wall thicknesses at the sheet metal construction and the supporting structure may be of substantially identical design. Differences between the wall thicknesses may be smaller than +/−50% and preferably smaller than +/−20%.

At least one supporting unit may be an integral component part of the sheet metal construction. The individual modifications of the crossbar may be formed by an integral component. For this purpose, the sheet metal construction may be formed by a sheet metal panel that is deformed along at least the front side and/or the upper side, for example by deep drawing. During the deformation, a lower side may be formed on the sheet metal construction. In an integral construction, a rear side may be a punched/bent part. Surfaces that are not required are punched out, and the remaining surfaces are bent over in such a manner that the required supporting device arises. Finally, the supporting device is folded over as a whole, or individual supporting units are folded over, into the interior of the sheet metal construction. Thus, the supporting units or the supporting device contribute to the stiffening of the interior of the crossbar.

At least one supporting unit may be a separate punched/bent part. After the punching out of a suitable metal sheet, the individual modifications of the supporting unit are bent over as desired. Subsequently, the supporting unit can be introduced, or the supporting units are introduced, or the entire supporting structure is introduced, into the interior of the beam-shaped sheet metal construction. The supporting units can be connected to the sheet metal construction in a frictional and/or integrally bonded manner via suitable connecting means.

The supporting structure or at least one supporting unit may be formed by at least one punched/bent part. The sheet metal construction of the crossbar may be deep drawn.

The front side of the crossbar may be formed substantially or overall from a deep-drawn metal sheet. The rear side of the crossbar may be a punched/bent part.

The sheet metal construction of the crossbar and at least one supporting unit may be connected to each other by connecting means, such as, a weld seam, rivets, screws or other connecting means.

The crossbar may have generous rounded portions at the lateral ends and may have a rounded surface on the front.

In all refinements, the sheet metal construction and/or the supporting device may be produced by cold deformation.

Cavities between the supporting units and within the supporting units achieve a high degree of stability with high deformation capability. Thus, large forces can be absorbed and dissipated. The rollover protective device permits a considerable dissipation of energy while at the same time achieves effective protection of the occupants of a passenger vehicle.

When the rollover protective device is installed correctly, the depressions may extend substantially in a longitudinal direction of the passenger vehicle.

Optimum utilization of material can be achieved by producing a rollover protective device, and in particular a crossbar, from metallic sheets. Production from one or more metal sheets achieves minimum and uniform wall thicknesses. A continuous and high deformation capability can be ensured so that high and very high forces can be absorbed and dissipated. The overall weight can be reduced and the rounded portions avoid sharp edges.

At least two supporting units may be provided, but the number of supporting units preferably is smaller than nine. In one preferred refinement, the supporting device comprises three supporting units.

The individual supporting units can have vertical walls. In particular, the rear wall of the supporting units can be oriented substantially vertically. Side walls of the supporting units may be inclined with respect to the vertical. Angles of between approximately 0° and 45° relative to the vertical are possible. In particular, the angle of at least one side wall with respect to the vertical is between 5° and 45°. It is also possible that a central and approximately middle supporting unit has side walls with a steeper orientation than supporting units arranged farther on the outside.

The supporting units may be approximately symmetrical with respect to the center of the crossbar, and therefore the crossbar is formed substantially mirror-symmetrically with respect to a vertical plane.

The supporting device and/or the crossbar may be height-adjustable and in particular extendible in the event of a crash. For example, the crossbar can be provided together with the supporting device in a height-adjustable manner. However, it is also possible for the crossbar can be height-adjustable in relation to the supporting device. Adaptation to the particular situation and/or the user can then take place. The roll bar may not be extendible to reduce cost or for other reasons It is also possible.

The crossbar may have at least one lateral arch to achieve a greater degree of elasticity, improved bendability and an increased contact area.

The supporting device may comprise at least one vertical support. A collar may be formed on the crossbar. The collar can surround the vertical support at the front and rear and possibly also laterally. The crossbar may be anchored on the supporting device in a form-fitting manner. The crossbar and the supporting device can be connected to each other here in a form-fitting manner. The crossbar can, in particular, engage in an inner profile of the vertical support in a form-fitting manner.

A crossbar produced from metal sheets permits an optimum utilization of material with minimum and uniform wall thickness, which leads to a continuous deformation capability.

A maximum use of height in the available construction space is permitted in the retracted/extended state and maximum use can also be made of the width. A lateral arch permits better bendability and a sufficient contact area.

If the crossbar is formed from plural parts, the supporting structure or the supporting units of the supporting structure may be fastened to the sheet metal construction via suitable fastening or connecting means. A form fit of the individual components also reduces the number of the connecting means, for example, the number of weld seams.

Further advantages and features of the invention emerge from the exemplary embodiments that are explained below with reference to the figures.

BRIEF DESCRIPTION OF DRAWINGS

FIG. 1 is a perspective view of a rear side of a rollover protective device according to the invention.

FIG. 2 is a schematic cross section through the crossbar (longitudinal section with respect to the vehicle) in a central region of the rollover protective device according to FIG. 1.

FIG. 3 is a schematic cross section through the crossbar (longitudinal section with respect to the vehicle) in a lateral region of the crossbar from FIG. 1.

DETAILED DESCRIPTION

Figure 4:
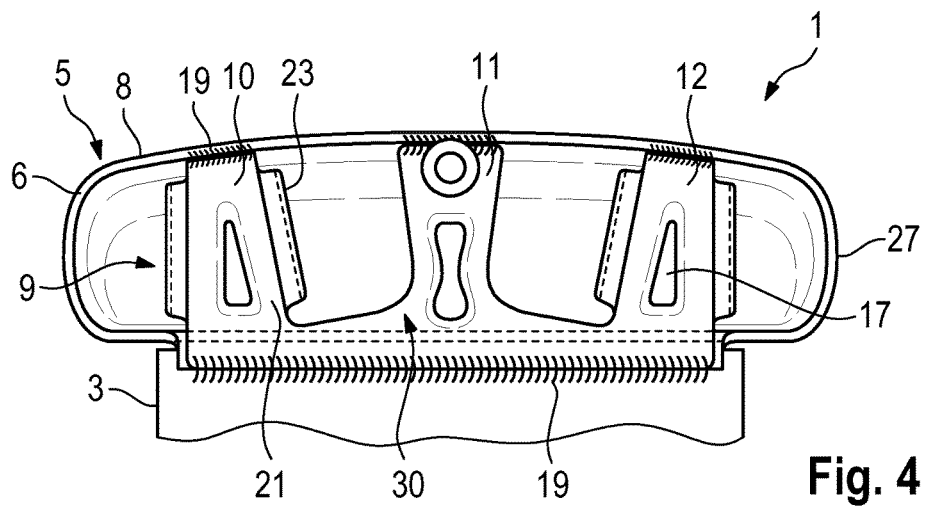
FIG. 4 is a rear view of a further rollover protective device according to the invention.

FIG. 1 shows a first embodiment of a rollover protective device 1 according to the invention which comprises a supporting device 3 extending substantially in the vertical direction 2. A crossbar 5 extends transverse to the supporting device 3 and hence in the lateral direction 4. The crossbar 5 has a basic body formed from a sheet metal construction 6 and a supporting structure 9 is accommodated in the interior of the sheet metal construction 6 or of the basic body of the crossbar 5.

In the embodiment of FIGS. 1 to 3, the supporting structure 9 is formed integrally as one piece with the sheet metal construction 6. The sheet metal construction 6 and the supporting structure 9 together form the crossbar 5, which is overall of beam-shaped design and is generously rounded at each lateral end.

The sheet metal construction 6 is produced from a metallic sheet that is formed by a deep drawing deformation process to form the substantially beam-shaped structure of the crossbar 5. The deformation process results in the formation of the interior of the sheet metal construction 6, and the interior subsequently is stiffened by the supporting structure 9 with supporting units 10, 11 and 12.

Cavities 14, 15 are formed between and next to the supporting units 10 to 12. Overall, five cavities are provided here, with the cavities 14, 15 extending substantially in a longitudinal direction 13 of a vehicle when the crossbar 5 and the rollover protective device 1 are installed correctly.

Each supporting unit 10-12 has a rear wall 21. Lateral walls 22 and 23 are formed on the individual supporting units 10 to 12 by a bending process and extend substantially in the longitudinal direction 13 of the vehicle and at least partially in the vertical direction. Lateral supporting feet 24, 25 are bent over at the lower end of the supporting units 10 to 12 and are supported on the lower side 29 of the sheet metal construction and provide better dissipation of forces.

In this embodiment, the central middle supporting unit 11 is connected unitarily with the lower side 29 of the sheet metal construction 6 and, after being punched out, is bent up. A fastening 18 for the rear window penetration element is provided at the upper end and is stabilized by the supporting unit 11. The upper end of the supporting unit 11 of tab-shaped design can be riveted, welded or screwed to the upper side 8 of the sheet metal construction. A frictional connection is also conceivable.

The side walls 22, 23 of the middle support unit 11 extend virtually perpendicularly upward in this view. However, the side walls 22 and 23 of the left supporting unit 10 and the right supporting unit 12 are more greatly inclined with respect to the vertical for optimal dissipation of forces occurring during a rollover.

FIG. 2 is a schematic longitudinal section through the middle supporting unit 11 of FIG. 1, in which the beam-shaped cross section of the crossbar 5 can be seen.

FIG. 3 is a longitudinal section through the cavity 15 and shows the supporting unit 12 with the side wall 22 in the background. The rear wall 21 of the supporting unit 12 is behind the side wall 22 and is shown by dashed lines. The side wall 22 has an approximately triangular profile, with one side of the triangle running parallel to the rear side 21 and another side of the triangle running parallel to the upper side 8.

Figure 5:
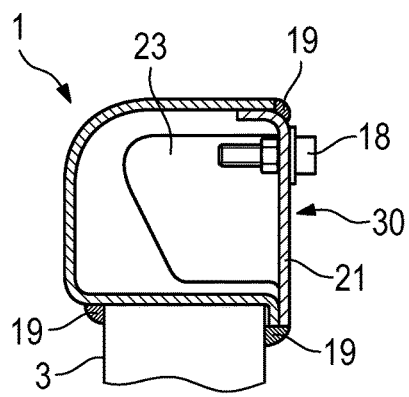
FIG. 5 is a schematic cross section through the crossbar (longitudinal section with respect to the vehicle) in a central region of the crossbar from FIG. 4.

FIGS. 4 and 5 show a further embodiment of a rollover protective device 1 according to the invention, where the crossbar 5 is formed by a sheet metal construction 6 and a supporting structure 9. The basic design of the rollover protective device 1 of FIG. 4 corresponds to the design of the rollover protective device 1 of FIG. 1. However, the crossbar of FIGS. 4 and 5 is not produced from an integral metal sheet, but rather the sheet metal construction 6 with the basic body of the crossbar 5 is produced by a deep drawing process or another type of deformation.

The supporting structure 9 with the 3 supporting units 10 to 12 is premanufactured as a separate part and subsequently is inserted into the interior of the sheet metal construction 6 or of the (basic) body of the crossbar 5. Subsequently, the supporting structure 9 is fixed to the sheet metal construction 6 by suitable connecting means 19. In particular, the adjoining edges of the supporting structure 9 and of the sheet metal construction 6 are welded to each other (at least at points and in particular in sections or else circumferentially).

In contrast to the previous exemplary embodiment, on the individual supporting units 10 to 12, impressions 17 are formed on the respective rear walls, and therefore the stability can be increased even further.

The two-part structure of the crossbar 5 can be seen in FIG. 5, and has the sheet metal construction 6 connected to the main body of the crossbar 5 and has the supporting structure 9 connected at the connecting points via suitable connecting means 19 (weld seams here). The crossbar 5 also is connected to the supporting device 3 via suitable connecting means (likewise weld seams).

Figure 6:
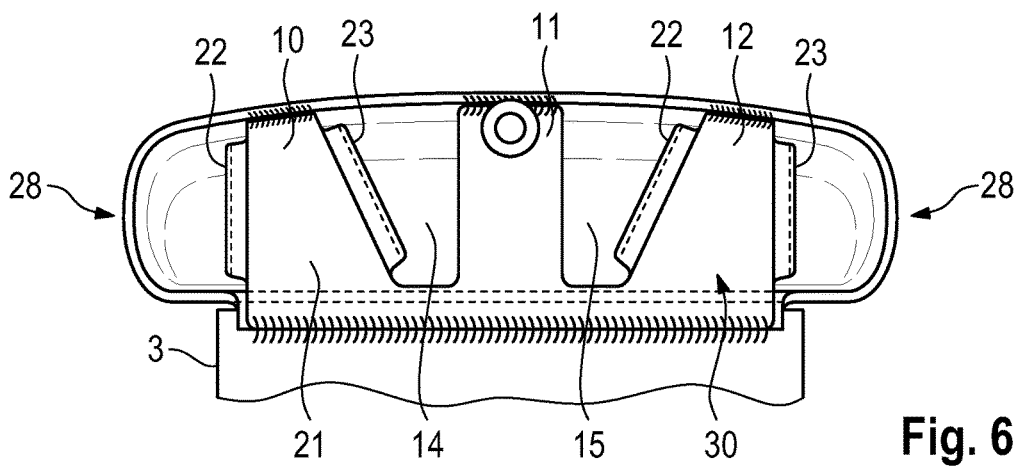
FIG. 6 is a rear view of a further rollover protective device according to the invention.

FIG. 6 is a rear view of a further refinement of a rollover protective device 1 where the supporting structure 9 is a separate component that is connected fixedly (e.g. welded) to the sheet metal construction 6 that forms the basic body of the crossbar 5. The rollover protective device 1 of FIG. 6 also has substantially the same construction as the rollover protective devices 1 of FIGS. 1 and 4. In particular, the supporting structure 9 comprises plural supporting units 10 to 12 each of which has a rear wall 21 and side walls 22 and 23 angled therefrom. Cavities 14, 15 are provided between the supporting units. Cavities 26 also are formed in the individual supporting units 10 to 12.

Figure 7:
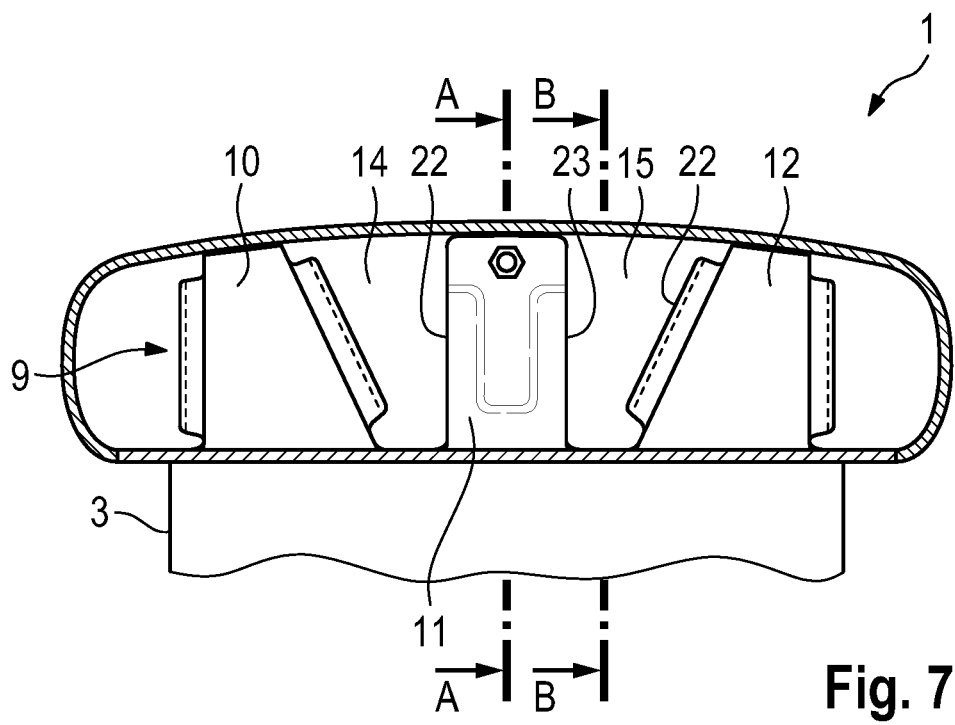
FIG. 7 is a rear view of a further rollover protective device according to the invention.

FIGS. 7 to 10 depict another embodiment of a rollover protective device 1 according to the invention, where FIG. 7 illustrates a rear view of the rollover protective device 1. This rollover protective device 1 also has basically the same design as the previously described rollover protective devices 1. However, the crossbar 5 has two different components, namely the sheet metal construction 6 and the supporting structure 9. The supporting structure 9 also forms the lower wall or lower side 29 of the crossbar 5. Furthermore, by way of example, three supporting units 10 to 12 are shown on the supporting structure 9 for vertically supporting and stiffening the crossbar 5.

Cavities 14, 15 are provided adjacent the supporting units 10 to 12. The supporting units 10 to 12 can have a, for example, U- or V-shaped cross section.

Figure 8:
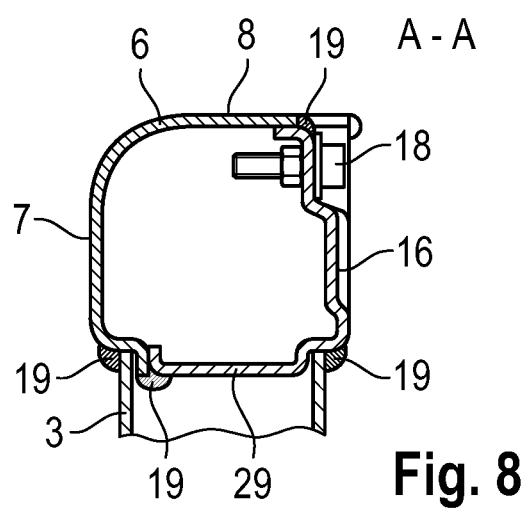
FIG. 8 is a cross section taken along line A-A through the crossbar (longitudinal section with respect to the vehicle) of FIG. 7.

FIG. 8 is a schematic longitudinal section taken along line A-A of FIG. 7, in which the connecting points of the sheet metal construction 6 and of the supporting structure 9 can be seen. Connecting means 19 in the form of weld seams or the like connect the crossbar 5 to the supporting device 3.

Figure 9:
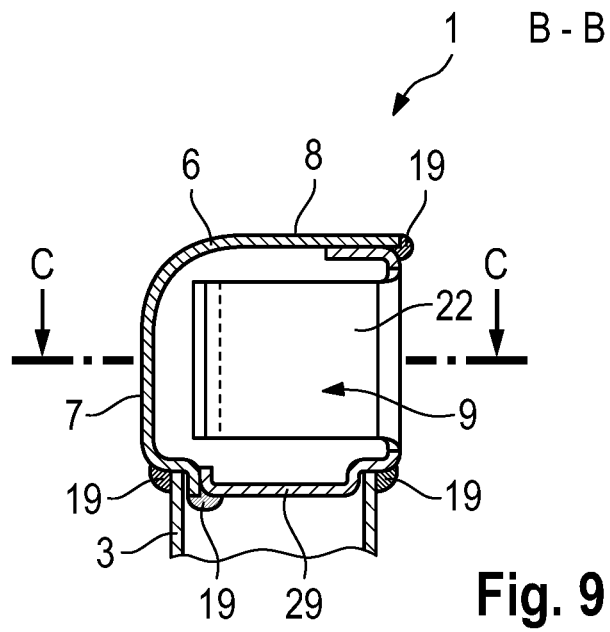
FIG. 9 is a cross section taken along line B-B (longitudinal section with respect to the vehicle) of FIG. 7.

FIG. 9 is a longitudinal section taken along line B-B of FIG. 7 through the cavity 15. The side wall 22 of the supporting unit 12 can be seen in the background. It can also be seen that the crossbar 5 is formed from the sheet metal construction 6 and the supporting structure 9. The crossbar 5 is also supported in a form-fitting manner on the supporting device 3 so that even better stability is achieved.

Figure 10:
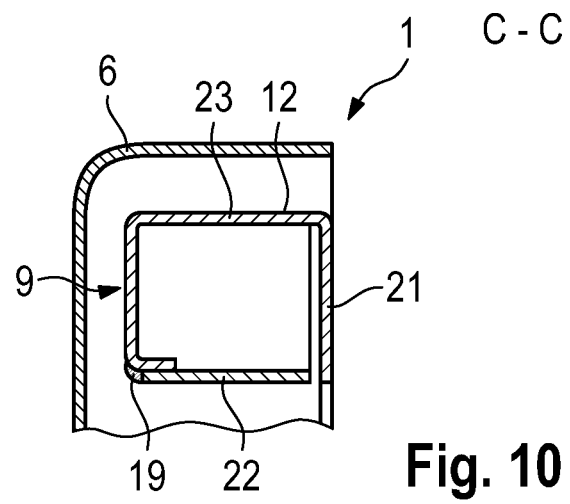
FIG. 10 is a vertical section along line C-C of FIG. 9.

FIG. 10 is a vertical section taken along line C-C of FIG. 9 and illustrates the supporting unit 12 in cross section.

Figure 11:
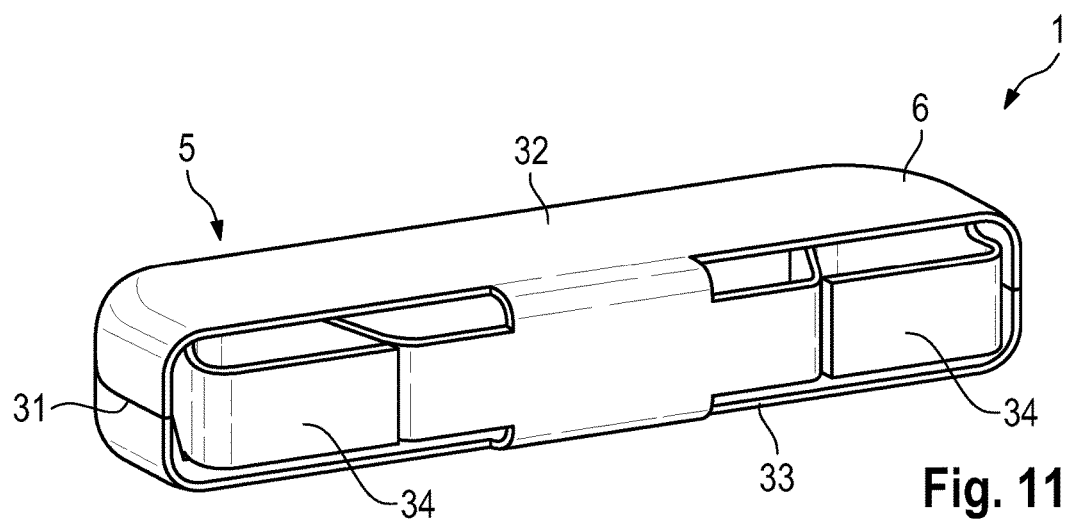
FIG. 11 is a perspective view of a further embodiment of a rollover protective device according to the invention.

Yet another embodiment of a rollover protective device according to the invention is illustrated in FIGS. 11 to 14. FIG. 11 is a schematic perspective view is a rollover protective device 1 or a crossbar 5 of a rollover protective device 1. The crossbar 5 here consists substantially or even completely of an integral sheet metal construction 6. The crossbar 5 comprises an upper shell 32 and a lower shell 33 that are connected to each other fixedly at the abutting edges via a weld seam 31 that is central and circumferential. An inner reinforcement 34 is provided in the interior of the crossbar 5 as a supporting structure 9 with which the stability is ensured or increased. The supporting structure 9 comprises at least the supporting units 10 and 11.

Figure 12:
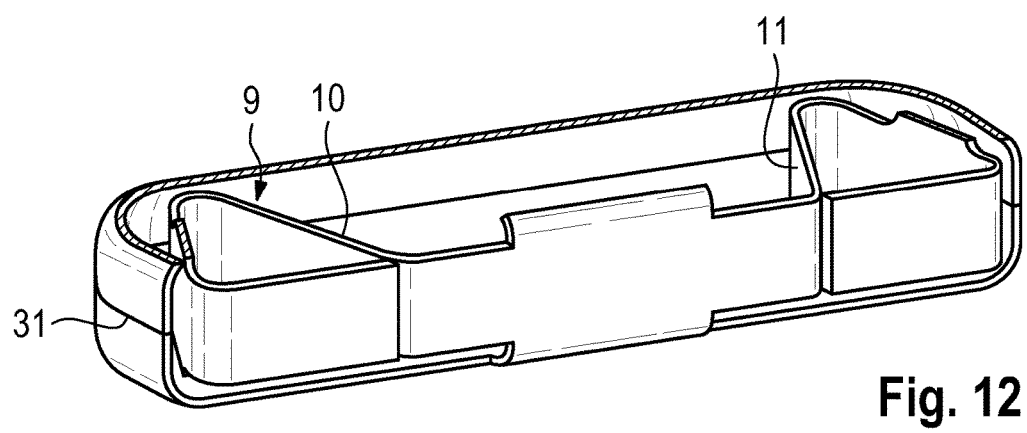
FIG. 12 is a perspective view of the rollover protective device of FIG. 11 with the cover cut away.
Figure 13:
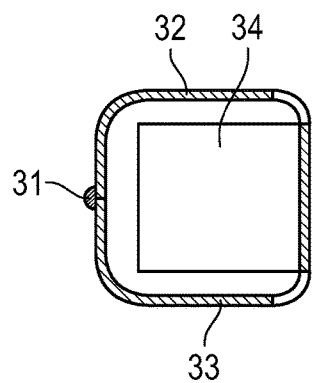
FIG. 13 is a cross section through the rollover protective device of FIG. 11.
Figure 14:
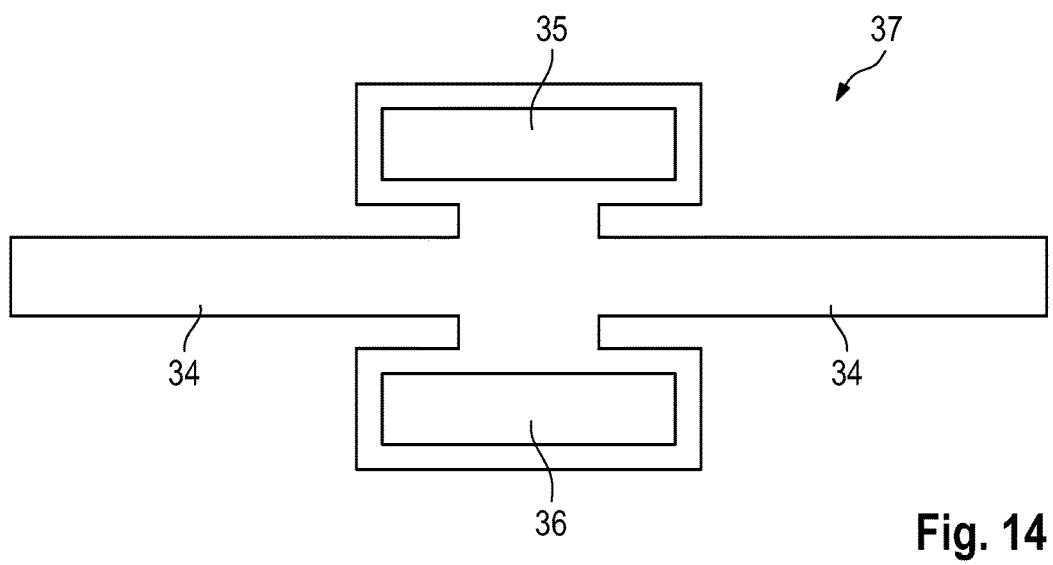
FIG. 14 is a developed view of the blank for the rollover protective device of FIG. 11.

FIG. 12 shows the crossbar 5 of FIG. 11 with the cover cut away, as a result of which the interior can be better seen. The crossbar 5 is manufactured from an integral metal sheet or blank 37 depicted in FIG. 14. In the region of the upper shell 32, the deep drawn region 5 is deep drawn or stamped and the deep drawn region 36 is deep drawn or stamped on the lower shell 33. Subsequently, the blank 37 is bent over, thus producing the finished bent/punched part, and the abutting edges of the upper shell and lower shell are fixedly connected to each other via the weld seam 31. The cross section illustrated in FIG. 13 is produced. The supporting structure 9 as an inner reinforcement 34 is an integral component part of the blank 37 here and is therefore formed in one piece with the crossbar 5.

Overall, the safety and the stability in a passenger vehicle and in particular a convertible are increased with the rollover protective device 1 according to the invention. The crossbar 5 of the rollover protective device 1 according to the invention is distinguished by a low weight and a high degree of stability and high and uniform deformability while at the same time the production is possible relatively simply and cost-effectively.

In all of the refinements, cushions or end caps can be avoided by means of a suitable rounded portion. At the same time, high dissipation of energy is possible. In all of the refinements and developments, use is preferably made of metal sheets and in particular aluminum sheets in order to form an integral or two-part aluminum sheet metal construction with a deformed front and upper side and an inserted or retracted inner supporting structure. The supporting structure can be fixed in position by rivets or by weld seams or else by screws or other suitable connecting means.

LIST OF REFERENCE NUMBERS

1 Rollover protective device
2 Vertical elevation
3 Supporting device
4 Lateral direction
5 Crossbar
6 Sheet metal construction, basic body
7 Front side
8 Upper side
9 Supporting structure
10 Supporting unit
11 Supporting unit
12 Supporting unit
13 Longitudinal direction
14 Cavity
15 Cavity
16 Rear side
17 Impression
18 Fastening of the rear window penetration element
19 Connecting means
20 Bend
21 Rear wall
22 Side wall
23 Side wall
24 Supporting foot
25 Supporting foot
26 Cavity
27 Arch
29 Lower side
30 Punched/bent part
31 Weld seam
32 Upper shell
33 Lower shell
34 Inner reinforcement
35 Deep drawn region of upper shell
36 Deep drawn region of lower shell
37 Blank

What is claimed is:

1. A rollover protective device for a passenger vehicle, with a supporting device extending in the vertical direction and a crossbar fastened to the supporting device, the crossbar extending in a lateral direction and being formed from an integral sheet of sheet metal that has been deformed to define a lower panel supported on the supporting device, an upper panel opposed to the lower panel, at least one external panel extending between the upper and lower panels and an inner supporting structure extending between the upper and lower panels, the inner supporting structure including a plurality of support units spaced apart in the lateral direction extending unitarily from one of the upper and lower panels and into supporting contact with an interior surface of the other of the upper and lower panels.

2. The rollover protective device of claim 1, wherein the supporting structure comprises a plurality of rib- or foot-like supporting units.

3. The rollover protective device of claim 2, wherein cavities are provided between the supporting units.

4. The rollover protective device of claim 3, wherein at least one of the supporting units forms a cavity.

5. The rollover protective device of claim 2, wherein the supporting structure or at least one supporting unit is formed by at least one punched/bent part.

6. The rollover protective device of claim 2, wherein the sheet metal of the crossbar is deep drawn.

7. The rollover protective device of claim 6, wherein a front side of the crossbar is a deep-drawn metal sheet, and wherein a rear side is a punched/bent part.

8. The rollover protective device of claim 1, wherein the sheet metal of the crossbar and at least one supporting unit are connected to each other by a weld seam or by rivets.

9. The rollover protective device of claim 1, wherein the crossbar is provided with rounded portions at the lateral ends.

10. The rollover protective device of claim 1, wherein the crossbar has a rounded surface on a front side.

11. A rollover protective device for a passenger vehicle, with a supporting device extending in the vertical direction and a crossbar fastened to the supporting device, the crossbar extending in a lateral direction and being formed from sheet metal, the crossbar comprising: a lower panel supported on the supporting device, an upper panel opposed to the lower panel, a front panel extending between the upper and lower panels, and a plurality of supporting units spaced apart in the lateral direction and extending between the lower and upper panels and being disposed at least partly in an interior of the crossbar between the lower and upper panels, the upper panel and the front panel being integral with one another.

12. The rollover protective device of claim 11, wherein the lower panel is integral with the front panel.

13. The rollover protective device of claim 11, wherein the supporting units are integral with one of the upper and lower panels.

14. The rollover protective device of claim 12 wherein the supporting units are welded to the lower panel at a position rearward of the front panel.

15. The rollover protective device of claim 11 wherein the lower panel is welded to the front panel and is integral with the supporting units.

16. The rollover protective device of claim 15 wherein the supporting units are welded to the upper panel at a position rearward of the front panel.

17. The rollover protective device of claim 11 wherein the supporting device has an open top, and wherein the lower panel is deformed to nest into the open top of the supporting device.

18. A rollover protective device for a passenger vehicle, with a supporting device extending in the vertical direction and a crossbar fastened to the supporting device, the crossbar extending in a lateral direction and being formed from an integral sheet of sheet metal, the crossbar comprising: a lower panel having opposite front and rear ends and opposite lateral ends, front and rear panels opposed to one another and bent up from the front and rear ends of the lower panel, front and rear upper panels bent toward one another from upper ends of the front and rear panels, front and rear lateral panels extending toward one another from opposite lateral ends of the front and rear panels and laterally spaced supporting structures extending from the opposite lateral ends of the lower panel and bent to extend toward the upper panels for reinforcing the crossbar between the upper and lower panels.

19. The rollover protective device of claim 18, wherein the lateral panels curve integrally from the upper panels.

20. The rollover protective device of claim 18, wherein the front and rear upper panels are welded in edge-to-edge relationship with one another and the front and rear lateral panels are welded in edge-to-edge relationship with one another.

\* \* \* \* \*